United States Patent [19]

Hiroichi et al.

[11] Patent Number: 4,459,431

[45] Date of Patent: Jul. 10, 1984

[54] OUTPUT CONTROL SYSTEM FOR DOT-TYPE PRINTER

[75] Inventors: Teramura Hiroichi, Tokyo; Yasuhiro Yamazaki, Hiratsuka; Kazuo Hasuike, Tokyo, all of Japan

[73] Assignee: Kokusai Denshindenwa Co., Ltd., Tokyo, Japan

[21] Appl. No.: 402,571

[22] Filed: Jul. 28, 1982

[30] Foreign Application Priority Data

Jul. 31, 1981 [JP] Japan .................................. 56-119272

[51] Int. Cl.³ ............................................ H04L 15/24
[52] U.S. Cl. ...................................... 178/30; 400/121; 400/124
[58] Field of Search ................ 178/30, 26 R; 340/735; 400/124, 121

[56] References Cited

U.S. PATENT DOCUMENTS 3,999,168 12/1976 Findley et al. ......................... 178/30
4,298,290 11/1981 Barnes et al. ............................ 400/3

OTHER PUBLICATIONS

A. J. Daflib & R. R. Schomburg, Proportional Spacing Roster Printer Character Generator, IBM Technical Disclosure Bulletin, vol. 15, No. 8, (Jan. 1973), pp. 2215–2216.

Primary Examiner—Stafford D. Schreyer

[57] ABSTRACT

A dot-type printer has heretofore been unable to output characters of the pitch which does not coincide with multiples of the dot-width by integers when such dot-width is either electrically or mechanically fixed, causing considerable errors and not being in compliance with the recommendation of CCITT. The system according to the present invention provides a means to obtain the distance between a character and a printing reference point and to output the character at a position which is separated from the reference point by the distance in a multiple of the dot-width by an integer and which is either immediately before or after the point of the distance thus obtained. By such output control, the character outputted can remain within the range recommended by CCITT with only negligible errors.

3 Claims, 9 Drawing Figures

FIG. 4(a) PAGE SYNC. 302a

FIG. 4(b) LINE SYNC. 302b

FIG. 5(a) PAGE SYNC. 302a

FIG. 5(b) LINE SYNC. 302b

FIG. 5(c) FAX CLOCK $CK_8$

FIG. 5(d) CHARACTER CLOCK $CK_{60}$

OUTPUT CONTROL SYSTEM FOR DOT-TYPE PRINTER

BACKGROUND OF THE INVENTION

The present invention concerns an output control system which is capable of having a dot-type printer effectively output objects such as characters with a pitch which does not coincide with a multiple of the dot-width by an integer which said device either electrically or mechanically is inherently provided with.

A dot-type printer comprises a system to scan an object such as a printing paper in the lateral direction (which is generally referred to as a main scanning system) and a system to scan it in the vertical direction (which is generally referred to as a sub-scanning system) and outputs dots at an interval either mechanically or electrically predetermined so as to express a character or a diagram with assembled dots. The printer of above mentioned type has been put into practice as an output system for various data processing and data transmission systems such as the facsimile communication or the character communication.

As widely known, a facsimile communication is a system wherein the data to be transmitted such as manuscripts or original drawings are divided into predetermined picture elements, the system being particularly appropriate for transmitting drawings. A character communication is the system wherein a text consisting of characters alone is converted into codes by each character for transmission which are subsequently decoded back to characters on the receiving side.

There is no problem in the case such a dot-type printer is used as an output device separately for various individual communication systems such as the facsimile system, the character communication system, etc.

The intercommunication system between different communication terminals has become possible in recent years as data communication technology progressed; for example, characters can be outputted from a computer by a character communication to a facsimile receiver. Since the coding efficiency is predominantly higher in the character coding than the facsimile coding, there has been contemplated a composite communication system wherein the character data contained in a manuscript to be transmitted is coded by the character coding while the drawing data therein is coded by the facsimile coding for transmission.

In the cases of intercommunication or composite communication mentioned above, however, there is involved a basic problem in that a single dot-type printer has to cope with outputs of both character communication and facsimile communication. More specifically the problems can be summarized as below:

(1) The facsimile resolution is determined by CCITT (Internation Telegraph and Telephone Consultive Committee) at 8.04 pel. (picture element)/mm in the direction of main scanning while the linear density (number of lines) is determined at 7.7 lines/mm or 3.85 lines/mm in the direction of sub-scanning.

(2) As to characters, according to CCITT a pitch (a space allocated for a character) is set at either one of the multiples of 2.54 mm/character (1/10 inch/character) for the lateral direction and of 4.233 mm/line (1/6 inch/line) for the vertical direction by one of the integers of 0.5, 1, 1.5 or 2. For other characters including proportional spacing characters traditionally used, the intervals are determined at a multiple of 1/60 inch by an integer (by 2 to 8) in the lateral direction and at a multiple of 1/12 inch by an integer (by 1 to 4) in the vertical direction.

(3) As shown in Tables 1 and 2, the character pitches above mentioned do not coincide with the multiple of the dot-width by any one of the integers both in lateral and vertical directions of facsimile, deviating from the range.

(4) In prior art, pitches of characters were fixedly approximated to a multiple of the facsimile dot-width by an integer. That, however, causes errors; for instance, in the case where the character width of 1/10 inch (2.54 mm) is approximated to 20 pel against 20.41 pel of facsimile dot-width, the error of about 2% occurs in accumulation, shortening the print of 200 mm by 4 mm or 2 characters. The pitches are heretofore not in compliance with the recommendation of CCITT.

TABLE 1

| Character Width (inch) | Number of Pels in Facsimile |
| --- | --- |
| 2/60 | 6.80 |
| 3/60 | 10.21 |
| 4/60 | 13.61 |
| 5/60 (1/12) | 17.01 |
| 6/60 (1/10) | 20.41 |
| 7/60 | 23.82 |
| 8/60 | 27.22 |

TABLE 2

| Line Width (inch) | Number of Scanning Lines in Facsimile (In the Case of 7.7 lines/mm) |
| --- | --- |
| 1/12 | 16.30 |
| 1/6 | 32.60 |
| ¼ | 48.89 |
| ⅓ | 65.19 |

SUMMARY OF THE INVENTION

The present invention aims to solve aforementioned problems encountered in prior art and to provide an output control system which is capable of outputting characters with pitches which does not coincide with the multiples of dot-width by an integer which the dot-type printer either electrically or mechanically is provided with, only within minor errors, but in compliance with the CCITT recommendation for example.

In order to achieve such a purpose, the present invention is characterized in that when an output object having a pitch different from a multiple by an integer of a dot-width is outputted to a dot-type printer having a constant resolution either in main scanning or in sub-scanning directions, the distance from a reference point is obtained for respective output objects, the positions of respective objects are approximated to a position either immediately before or after the said obtained distance among the positions separated from the reference point by the distances which are the multiples of dot-width by integers.

The present invention is based upon a technical concept that at the time of printing, the present position from a reference point (such as the left side of the character frame of the first character or the home position) is always made to be recognized, and if there is an error, the position is approximated to a dot position which is the closest position to the correct one when viewed from the reference point. The present invention is applicable to both character pitches in the main scanning direction (character width) and in the sub-scanning direction (line width) and further applicable not only to the case wherein character coding takes place at the same place where the dot-type printer exists but also to the case where two systems are located at separate and remote places and character codes are converted in facsimile data on the side of transmission to be transmitted via a communication circuit to a dot-type printer.

DETAILED DESCRIPTION OF PREFERRED EMBODIMENTS

The present invention will now be explained in detail referring to embodiments shown in attached drawings. Since dot-type printer devices can be represented by a facsimile receiver, a facsimile receiver is used hereinafter for the sake of explanation.

Figure 1:
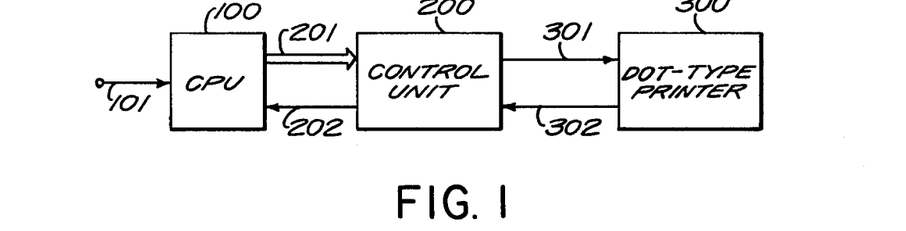
FIG. 1 is a block diagram to show an embodiment according to the present invention.
Figure 2:
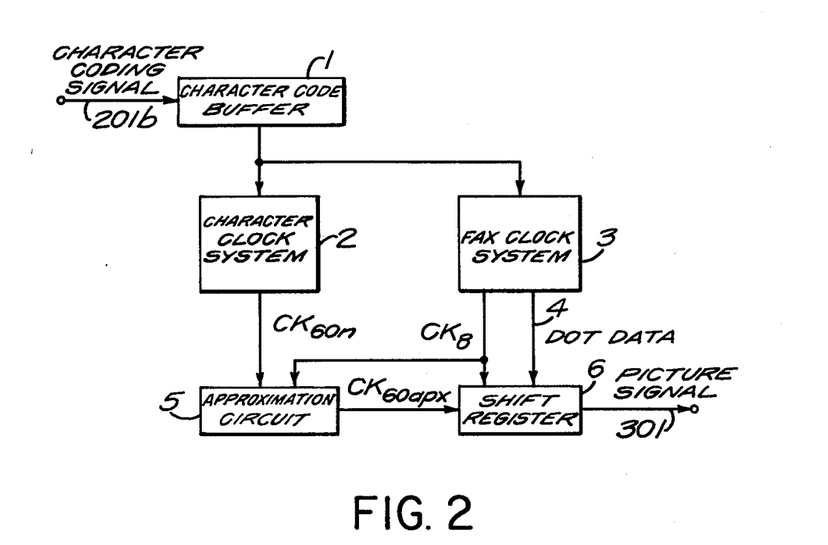
FIG. 2 is a schematic view to show a control system which embodies the present invention.

FIG. 1 shows an embodiment of the present invention wherein the reference numeral 100 denotes a central data processor unit (which is referred to as CPU hereinafter), 200 a control unit which embodies the present invention, and 300 a dot-type printer. FIG. 2 shows schematically an embodiment of the control unit 200.

In FIG. 1 CPU 100 stores one page of the data 101 which is inputted by an input means such as a communication circuit, etc. and they generate a character line for a line by inserting an appropriate number of blank signals between the start point and the home position of the dot-type printer 300 or adding such in the end of a line if the line is too short to composite a full line. CPU 100 receives a control signal 202 from the control unit 200 and transmits a print signal 201 including character coding signals to express the character line for said lines and signals to express the interval for lines to the control unit 200.

The resolution or the dot-width of the dot-type printer 300 is fixed either mechanically or electrically both in main scanning and the sub-scanning directions. In this case the resolution is 8.04 pel/mm in the main scanning direction and 7.7 lines/mm in the sub-scanning direction.

The control unit 200 which embodies the present invention controls the character code lines from CPU 100 by using a synchronizing signal 302 from the printer 300 and transmits a picture signal 301 to the dot-type printer 300. The picture signal is the one outputted in the form of a bit parallel row for scanning line.

The control unit 200 is provided with a function which can obtain the position at least for one scanning direction or the distance from a reference point (e.g. the home position or the top of a page) for respective objects (such as characters or signals) of which line width and line interval are not coincided with multiples of dot-width by an integer in the main and the sub-scanning directions of the dot type printer 300. It is further provided with a function to approximate the distance thus obtained to a position either immediately before or after it of those distances in the multiples of dot-width by an integer. Approximation is carried out by rounding up, rounding off or the method using threshold values. In the cases of rounding up and off, the errors in the line intervals and character intervals and the errors between the reference point and the last character of lines and between the reference point and the last line concentrate within a range of one fold dot-width or less while in the case of rounding fractions of 5 and over to the nearest whole number and disregarding the rest, the errors in the character intervals and in the line intervals concentrate within a dot width or less and the last character of each line and the last line remain within the limit of ½ of the dot-width from the reference point.

FIG. 2 schematically indicates the control unit 200 when it is applied to the control in the main scanning direction, comprising a character code buffer 1, a character clock system 2, a fax clock system 3, an approximation circuit 5 and a shift register 6. The character code buffer 1 retains code rows which correspond to character lines including one line equivalent blank codes which are fed from CPU 100 with the character coding signal 201b of the printer signal 201. The character clock system 2 is driven by a character clock which corresponds to the correct width of a character and outputs a correct position or a correct distance of each character from the home position as a character pulse $CK_{60n}$. The fax clock system 3 is driven by a fax clock which corresponds to the dot-width in the main scanning direction of the dot-type printer and outputs dot data 4 of characters using the dot-width of the fax in the main scanning direction as a unit. The approximation circuit 5 outputs an approximation pulse $CK_{60apx}$ or the signal which approximate the character pulse $CK_{60n}$ to fax clock $CK_8$. The shift register 6 loads the dot data from the fax clock system 3 by the approximation pulse $CK_{60apx}$ and shift the same with the fax clock $CK_8$. By loading with the approximation pulse $CK_{60apx}$ each character is corrected to remain in the range of position errors in one or ½ of the dot-width from the home position.

Figure 3:
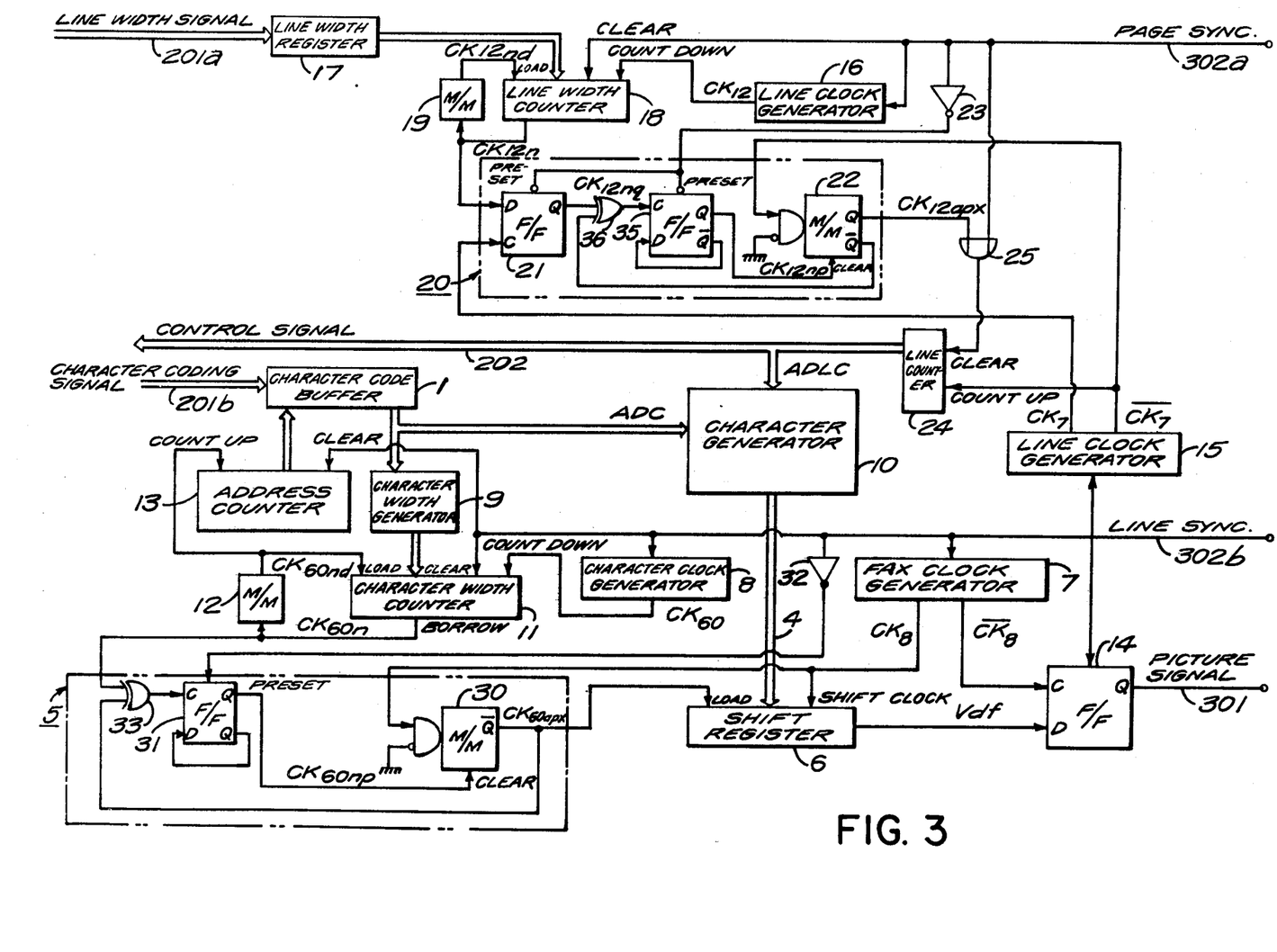
FIG. 3 is a circuit diagram to show an embodiment of the control system.

The present invention will further be explained referring to an example of circuit. FIG. 3 shows an example of the circuit of the control unit 200. This shows the case where both main and sub-scanning directions are approximated by counting fractions of 5 and over as a unit and disregarding the rest.

In FIG. 3 the reference numeral 7 denotes a fax clock generator which outputs fax clock $CK_8$ and clock $\overline{CK_8}$ which is delayed in phase by $\pi$ than $CK_8$. The cycle $T_8$ of the clocks $CK_8$ and $\overline{CK_8}$ is identical with the transmitting cycle of a picture signal 301 to the dot-type printer 300 and is assumed to have the duty factor of 50%. The reference numeral 8 denotes a character clock generator. The cycle $T_{60}$ of the character clock $CK_{60}$ transmitted from the generator is determined by the equation below since the character width is a multiple of 1/60 inch by an integer while the resolution in the main scanning direction is 8.04 pel/mm:

$$\frac{T_{60}}{T_8} = \frac{25.4/60}{1/8.04} \approx 3.4 \qquad \text{Formula (1)}$$

Figures 4A, 4B:
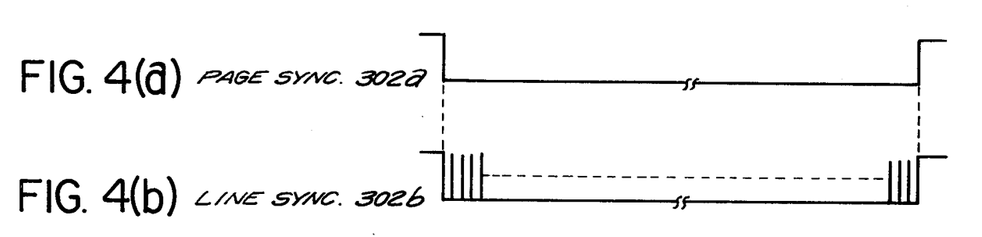
FIGS. 4, 5, 7 and 8 are timing charts to explain the performances of FIG. 3.
Figure 5A:
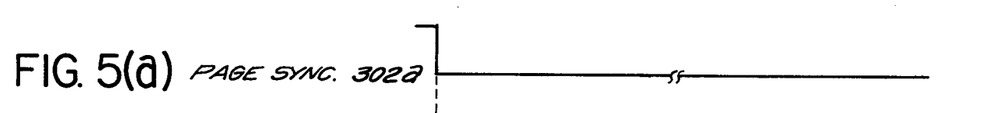
Figure 5B:
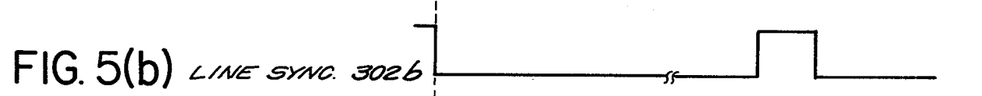
Figure 5C:
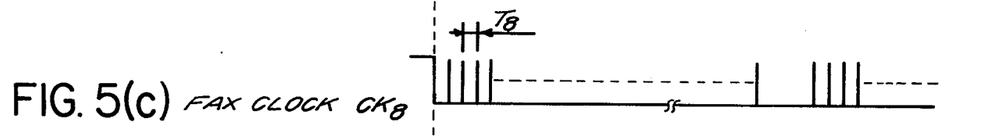
Figure 5D:
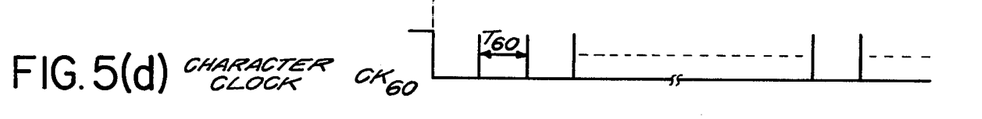
Figure 6A:
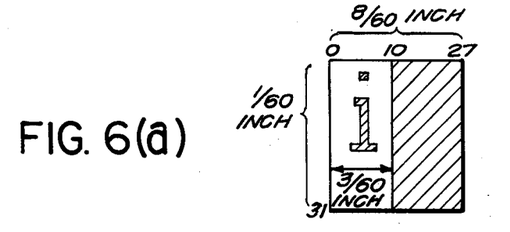
FIG. 6 is an explanatory view of a character generator.
Figure 6B:
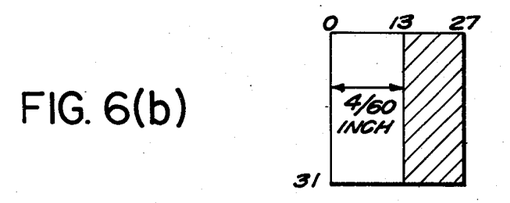
Figure 6C:
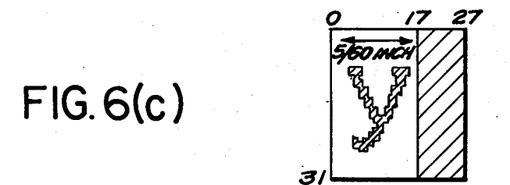
Figure 6D:
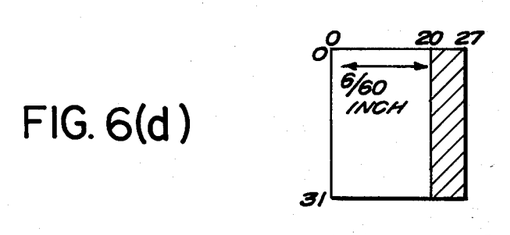
Figure 6E:
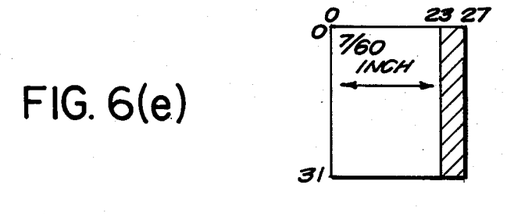
Figure 6F:
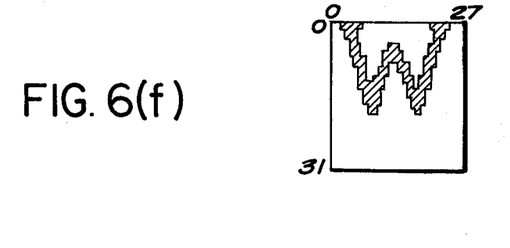

Those fax clock $CK_8$ and character clock $CK_{60}$ are made synchronized to the line synchronous signal $302b$ fed from the dot-type printer 300 while synchronization and duty factor thereof are determined by such a conventional technique as by dividing frequency of a higher harmonic. FIG. 4 indicates the relation between the line synchronous signal 302b and the page synchronous signal 302a whereas FIG. 5 shows the relation between those synchronous signals and the fax clock $CK_8$ and the character clock $CK_{60}$. The reference numeral 9 denotes a character width generator. Since in the case of proportional spacing characters the width varies depending on characters, this example uses a read-only memory which stores various character widths as a value which is smaller by [1] than an integer calculated from the unit of 1/60 inch. For example, if ASCII code is used as the character code, since the width of the letter "i" is 3/60 inch, [2] is outputted to the sexadecimal notation (69)H of ASCII code which expresses "i" whereas since the width of the letter "w" is 8/50 inch, [7] is outputted to (57)H of ASCII code.

The reference numeral 10 denotes a character generator which is a read-only memory to store the forms of various characters in the form of dot matrixes. The maximum width in this case is assumed to be at 8/60 inch, the maximum height at 1/60 inch and the size of the dot matrix at 28×32 so as to be applied to characters of 3/60 to 8/60 inch in width as shown in FIGS. 6(a) to (f). As the approximation error in character width remains equal to the dot-width or less, various character widths are approximated to either one of integers which are made by rounding up or off the fractions of the pel numbers indicated in Table 1. The width of the character frame at the character generator 10 therefore becomes an integer obtained by rounding up the pel number in Table 1. In order to secure an appropriate character width, the two bits at the extremely right within the character frame is made not to contain characters. It is also so adopted that a character of smaller width is to have a smaller frame deflected to the left and that the right side indicated by hatches in FIG. 6 is to be used as a blank space. The types of characters are determined by the character address ADC from the character code buffer 1 and while the value of the character line address ADCL remains between 0 to 31, a dot data 4 of 28 bits of the line corresponding to ADCL value out of the dot matrix of the said letter is outputted to the shift register 6. When the ADCL value is 32 or more, a dot row expressing a white or blank line is outputted.

The reference numeral 11 denotes a character width counter which counts the character clock $CK_{60}$ corresponding to 1/60 inch so as to measure the time corresponding to the character widths of various characters. The character width counter 11 in this example receives the output from the character width generator 9 to count down the character clock $CK_{60}$. The bolo output $CK_{60n}$ of the character width counter is the character pulse. The loading of the character counter 11 is carried out by the pulse signal $CK_{60nd}$ which is obtained by triggering a monostable multi-viblator 12 with the rise of the character pulse $CK_{60n}$. The pulse signal $CK_{60nd}$ used for loading is also used as a count-up input to the character code buffer address counter 13. It is cleared with the line synchronous signal 302b and then reads out the contents of the character code buffer 1 or in other words the character address ADC for every count-up.

The functions and performances above mentioned will now be indicated in FIGS. 7(a) to (l) for the case where the character width of the first character is 3/60 inch and that of the second character is 4/60 inch. The time of fall of the character pulse $CK_{60}$ correctly registers with the left point of the character frame of each character as shown in the drawings.

In this embodiment, the approximation circuit 5 comprises a monostable multi-vibrator 30 and D type flip-flop 31. The preset input of the D type flip-flop 31 is fed with the line synchronous signal 302b via an inverter 32 whereas the clock input is fed with the exclusive "OR" of the $\bar{Q}$ outputs of the character pulse $CK_{60n}$ and the monostable multi-vibrator 30 which are obtained from the gate 33. The data input of the D type flip-flop 31 is fed with its own $\bar{Q}$ output and is provided with the function of a T type flip-flop. The monostable multi-vibrator 30 is fed with the $\bar{Q}$ output $CK_{60np}$ of the D type flip-flop 31 for clear input and simultaneously with the fax clock $CK_8$ having the duty factor of 50% for trigger input in order to output a negative pulse. This negative pulse is the approximation pulse $CK_{60apx}$ rounded by the method of counting fractions of 5 and over as one unit and disregarding the rest. As indicated in FIGS. 7(b), (d), (e) and (i), one negative pulse $CK_{60apx}$ is outputted at the rise of the fax clock $CK_8$ immediately after the fall of the character pulse $CK_{60n}$. If it is assumed that the time difference in the falls between $CK_{60n}$ and $CK_{60apx}$ is $E_{60n}$ at the time of the fall of $CK_{60n}$, the following formulae hold:

(1) If $CK_8$ is at a high level, $\frac{1}{2}T_8 < E_{60n} < T_8$ ... Formula (2)

(2) If $CK_8$ is at a low level, $0 < E_{60n} \leq \frac{1}{2}T_8$ ... Formula (3)

Since the time error at the top of a line is always fixed at $\frac{1}{2}T_8$, the value Eh or the value obtained by substracting the said error $\frac{1}{2}T_8$ from all $E_{60n}$ can be obtained as $$\left. \begin{array}{l} \text{in the case of (2)} \ldots 0 < Eh < \frac{1}{2}T_8 \\ \text{in the case of (3)} \ldots - \frac{1}{2}T_8 < Eh \leq 0 \end{array} \right\} \quad \text{Formula (4)}$$

This means $CK_{60apx}$ approximates $CK_{60n}$ to the unit of $CK_8$ by counting the fractions of 5 and over as one unit and disregarding the rest. Compared to the character pulse of the correct time $CK_{60n}$, the time of the approximation pulse $CK_{60apx}$ from the home position remains in the scope of $\pm \frac{1}{2}T_8$, or in other words, within the error of one half of the dot-width in the main scanning direction. The error between adjacent approximated pulses is within the scope of $\pm T_8$ or, in other words, one-fold dot width or less.

The shift register 6 is a shift register with 29 bit parallel input wherein an approximation pulse $CK_{60apx}$ is naturally used for load input of 28-bit dot data and fax clock $CK_8$ is used for shift clock. The output Vdf of the shift register 6 is delayed in the synchronization by $\pi$ from the line synchronous signal 302b. In order to coincide the phase thereof by further delaying it by $\pi$, the output Vdf from the shift register 6 is supplied to the D input of the phase regulator of the D type flip-flop, and the clock $CK_8$ which is delayed by $\pi$ from the fax clock $CK_8$ is fed as a clock input, thereby obtaining a picture signal 301. By conducting such a phase regulation, the whole errors between characters and lines will be made concentrated within the scope mentioned above. As the first picture element of the line becomes white, no ill effect is produced.

Figures 7A, 7L:
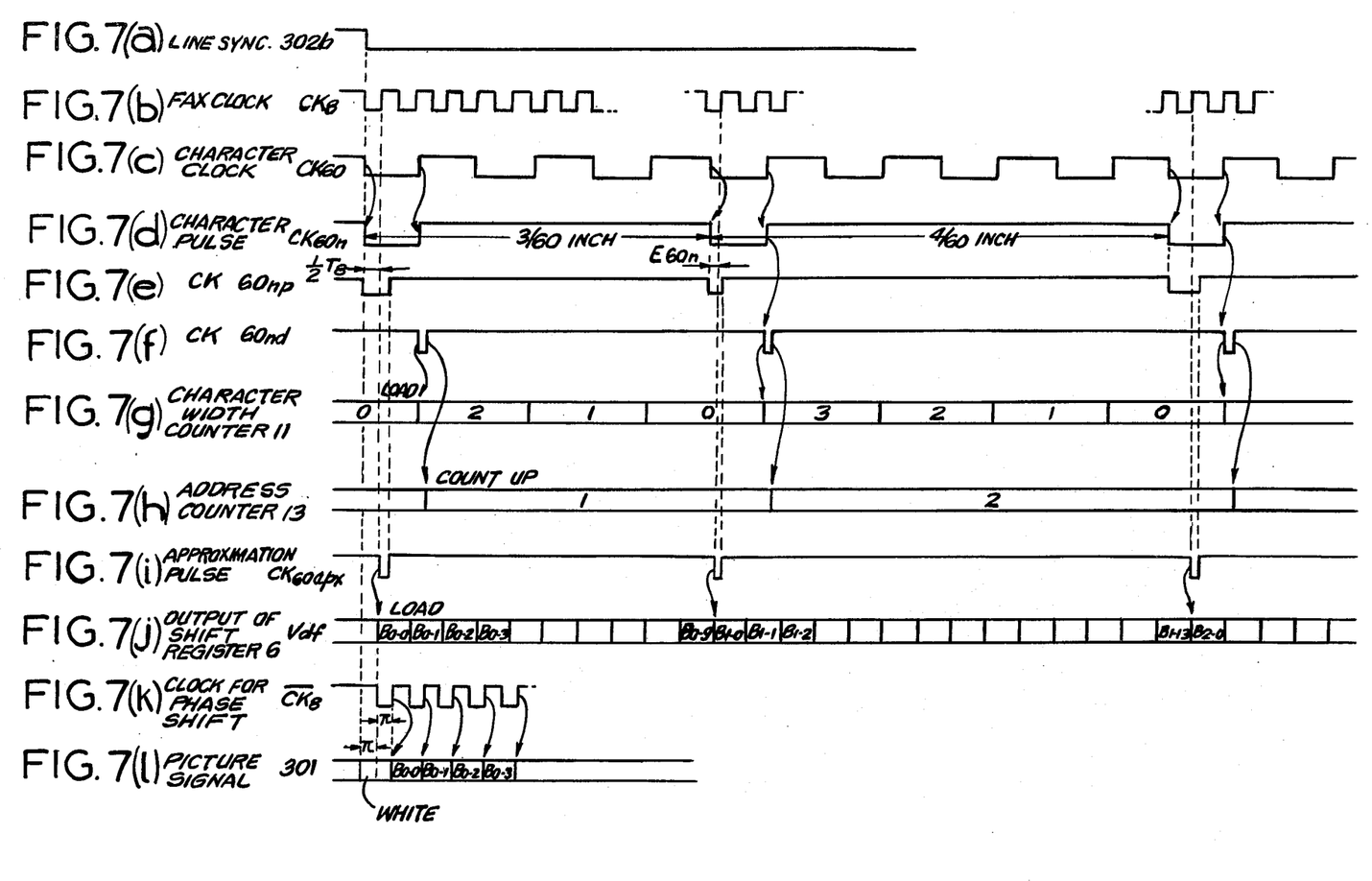

As described in the foregoings, every time an approximation pulse $CK_{60apx}$ is generated, the dot data from the character generator 10 is loaded in the shift register 6 and then is shifted by the fax clock $CK_8$, thereby keeping the positions of respective characters from the home position within the error of one half of the dot-width and keeping the error between characters within one-fold thereof. In FIGS. 7(j) and (l) the symbol $B_{i \cdot j}$ denotes the j-th dot data at the i-th character.

The above explains about the main scanning direction but the same is applicable to the sub-scanning direction, which will now be described referring to the waveforms of operation shown in FIG. 8. In FIG. 3, the reference numeral 15 denotes a line clock generator which outputs a line clock $CK_7$ and a clock $\overline{CK_7}$ which is delayed by $\pi$ therefrom. Those clocks $CK_7$ and $\overline{CK_7}$ are synchronized with the line synchronous signal 302b from the dot type printer 300 with the cycle $T_7$ identical to the line synchronous signal 302b and of the duty factor of 50%. The reference numeral 16 denotes a line clock generator. The line clock $CK_{12}$ generated therefrom is synchronized with the page synchronous signal 302a. As the resolution in the sub-scanning direction is 7.7 whilst the line width is a multiple of 1/12 inch by an integer, the cycle $T_{12}$ can be determined by the formula (5) below:

$$\frac{T_{12}}{T_7} = \frac{25.4/12}{1/7.7} \approx 16.30 \quad \text{Formula (5)}$$

The reference numeral 17 denotes a line width register which receives a line width signal 201a contained in the printer signal 201 from CPU 100 to memorize a value which is smaller by [1] than an integer expressed by using the unit of 1/12 inch.

The reference numeral 18 denotes a line width counter which measures the time corresponding to the correct line width for each line by counting the line clock $CK_{12}$ which corresponds to 1/12. The line width counter 18 operates in a manner similar to the aforementioned character width counter 11 to load the content of the line width register 17 and to output a bolo output $CK_{12n}$ by counting down the line clock $CK_{12}$. It is loaded with the pulse $CK_{12nd}$ which is obtained by triggering the monostable multivibrator 19 at the rise of the line pulse $CK_{12n}$.

The reference numeral 20 denotes an approximation circuit which in this embodiment comprises D type flip-flops 21 and 35 and a monostable multivibrator 22. The preset input of the D type flip-flop 21 is fed with a page synchronous signal 302a via an inverter 23 while the clock input thereof is fed with a line clock $CK_7$, and the data input with a pulse $CK_{12}$. The preset input of the D type flip-flop 35 is fed with a page synchronous signal 302a via an inverter 23 while the clock input thereof is fed with exclusive "OR" of Q output $CK_{12nq}$ of the D type flip-flop 21 and $\overline{Q}$ output of the monostable multivibrator 22 obtained from the gate 36. It further supplies the data input thereof to its own $\overline{Q}$ output so as to give the function of T type flip-flop thereto. The Q output from the D type flip-flop 35 is supplied to the monostable multi-vibrator 22 at the clear input thereof and simultaneously the clock $CK_7$ of duty factor of 50% is given thereto as a rise trigger input, thereby obtaining a rounded positive pulse or the approximated line pulse $CK_{12apx}$. In short, as shown in FIGS. 8(c) to (h), one positive pulse $CK_{12apx}$ is outputted at the rise of the clock $\overline{CK_7}$ following the rise of the line clock $CK_7$ immediately after the fall of the line pulse $CK_{12n}$ or in other words, at the fall of the line clock $CK_7$ immediately after the fall of the line pulse $CK_{12n}$. Assuming the time difference between the falls of $CK_{12n}$ and corresponding $CK_{12apx}$ is $E_{12n}$, the following formulae hold:

(a) If $CK_7$ is at a high level at the fall of $Ck_{12n}$, $T_7 < E_{12n} < 3/2 T_7$ ... Formula (6)

(b) If $CK_7$ is at a low level at the fall of $CK_{12n}$, $\frac{1}{2}T_7 < E_{12n} \leq T_7$ ... Formula (7)

Since $E_{12n}$ at the top of a page is always $T_7$, the value obtained by substracting the initial error $T_7$ from all the $E_{12n}$s becomes $$\left. \begin{array}{l} \text{in the case of (6) } 0 < Ev < \frac{1}{2}T_7 \\ \text{in the case of (7) } -\frac{1}{2}T_7 < Ev \leq 0 \end{array} \right\} \quad \text{Formula (8)}$$

That means $CK_{12apx}$ is approximated rounding $CK_{12n}$ to the unit of $CK_7$ by the method of counting the fractions of 5 and over as a unit and disregarding the rest. By this manipulation, the time of the approximation pulse $CK_{12apx}$ from the top of a page or from the home position concentrates within the scope of error of $\pm\frac{1}{2}T_7$ or one half of the dot width in the sub-scanning direction ($T_7$).

Figures 8A, 8I:
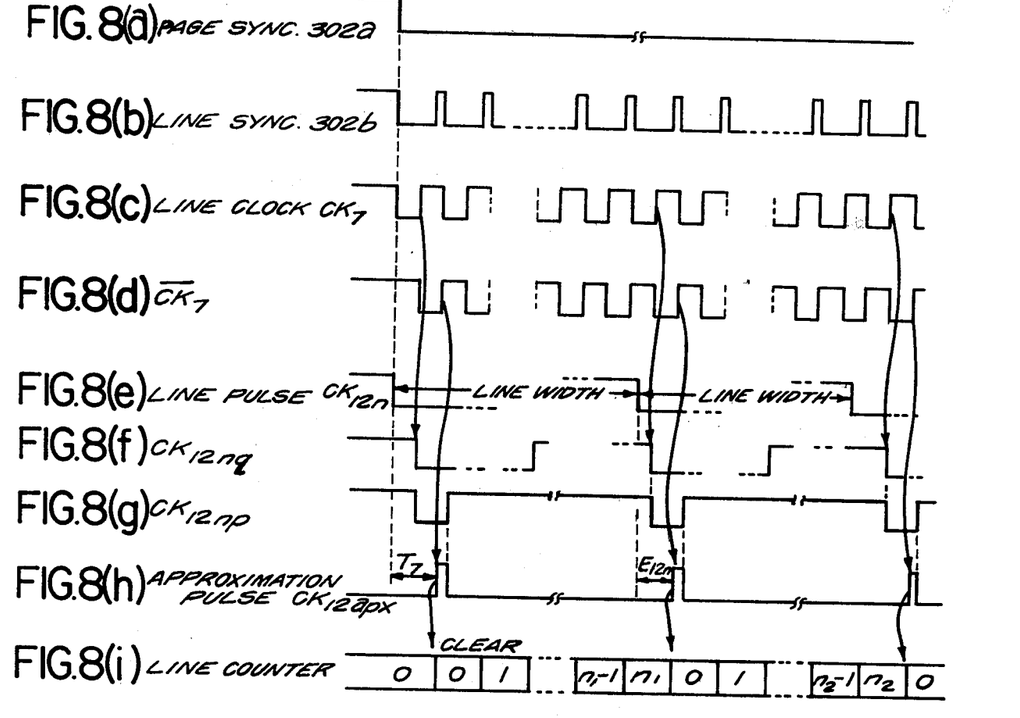

The reference numeral 24 denotes a line counter which receives the approximation pulse $CK_{12apx}$ of a line width from the approximation circuit 20 and a page synchronous signal 302a via an OR gate 25 as a clear input and receives clock $\overline{CK_7}$ which is delayed by $\pi$ from the line clock $CK_7$ as a count-up input. (Refer to FIG. 8 (i)). The output from this line counter 24 is the character line address ADCL to be supplied to the character generator 10. By clearing the character line address ADCL with the approximation pulse $CK_{12apx}$, positions of each line from the page top concentrate within the one half of the dot-width error while the line widths concentrate within the scope of dot width with the error of one-fold thereof. The content of the line counter 24 will be delayed by one line if it is simply cleared with an approximation pulse $CK_{12apx}$ although it is synchronized in phase with the page synchronous signal 302a. As shown in the figure, it therefore is given with a page synchronous signal 302a in the clear input in order to cause the content of the line counter 24 to become [0] for the first one line. Since the first line becomes white by giving a blank code to the character code buffer 1 as for the first row, there remain no adverse effects.

The content of the line counter 24 also doubles as the control signal 202 to CPU 100 from which CPU 100 can recognize the end of printing of each line so as to supply the signal 201b of the character code row corresponding to the following line to the character code buffer 1 and simultaneously to supply a line width to the line width register 17.

Figure 9:
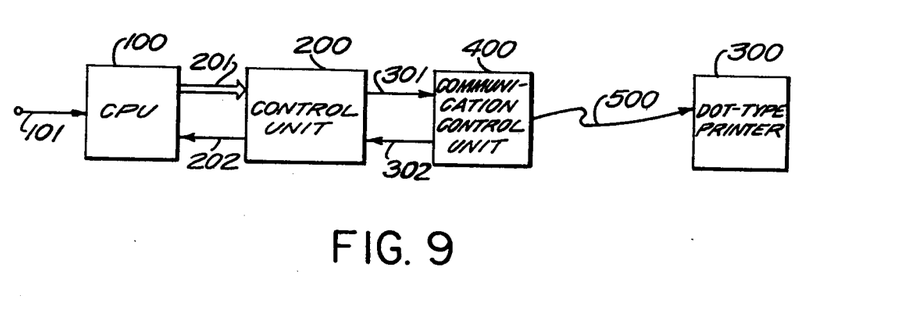
FIG. 9 is a block diagram of another embodiment of the present invention.

The embodiment described in the foregoings with the reference made to FIGS. 1 to 8 relates to the case wherein the system of generating character codes exists at the same place as the dot type printer. FIG. 9, on the other hand, shows another system wherein those two places exist separately at remote and separate places and character codes are converted to facsimile data on the side of transmitter to be transmitted over a communication circuit to a dot type printer.

In FIG. 9 the reference numeral 100 denotes a CPU, 200 a control system according to the present invention, 300 a dot type printer, 400 a communication control unit, and 500 a communication circuit. The reference numeral 201 denotes printer signals from the CPU 100 to the control unit 200, including character code row signals expressing the character rows of each line, and signals expressing the line intervals. The reference numeral 202 denotes a signal which expresses the end of lines and which is sent from the control unit 202 to the CPU 100. In this embodiment the signals 302 of either page synchronous or of line synchronous from the control unit 200 are fed from the communication control unit 400 and the picture signal 301 from the control unit 200 is transmitted to the dot type printer 300 with the appropriate timing via the communication control unit 400.

In the case of the system wherein character data in a manuscript is transmitted in the form of a character code and drawing data in a form of a facsimile code, if the part to be converted into the character codes is converted into facsimile codes by using the output control system according to the present invention, picture signals with minimum errors in the positions of character can be inputted into the dot type printer.

I claim:

1. An output control system for dot type printers having a fixed resolution in either main scanning direction or sub-scanning direction which is characterized in that when an output object of a pitch which does not coincide with multiples of the dot width by integers, the distance from a reference point in the direction with the fixed resolution is obtained for respective objects, and that said obtained distance is approximated to a distance immediately before or after such distance selected out of those separated from the said reference point by multiples of the dot width by integers.

2. The output control system for dot type printers as claimed in claim 1 which is characterized in that at the time of approximation of the said objects, the distance of the objects from the reference point is calculated by using the unit of the dot width, and that such value of the distance is approximated by rounding off the value to an integer immediately below if the fraction decimal order is smaller than a predetermined threshold value and by rounding up the value to an integer immediately above if the decimal fraction is larger than the threshold value.

3. The output control system for dot type printers as claimed in claim 2 which is characterized in that the said threshold value is 0.5.

* * * * *